UNITED STATES PATENT OFFICE.

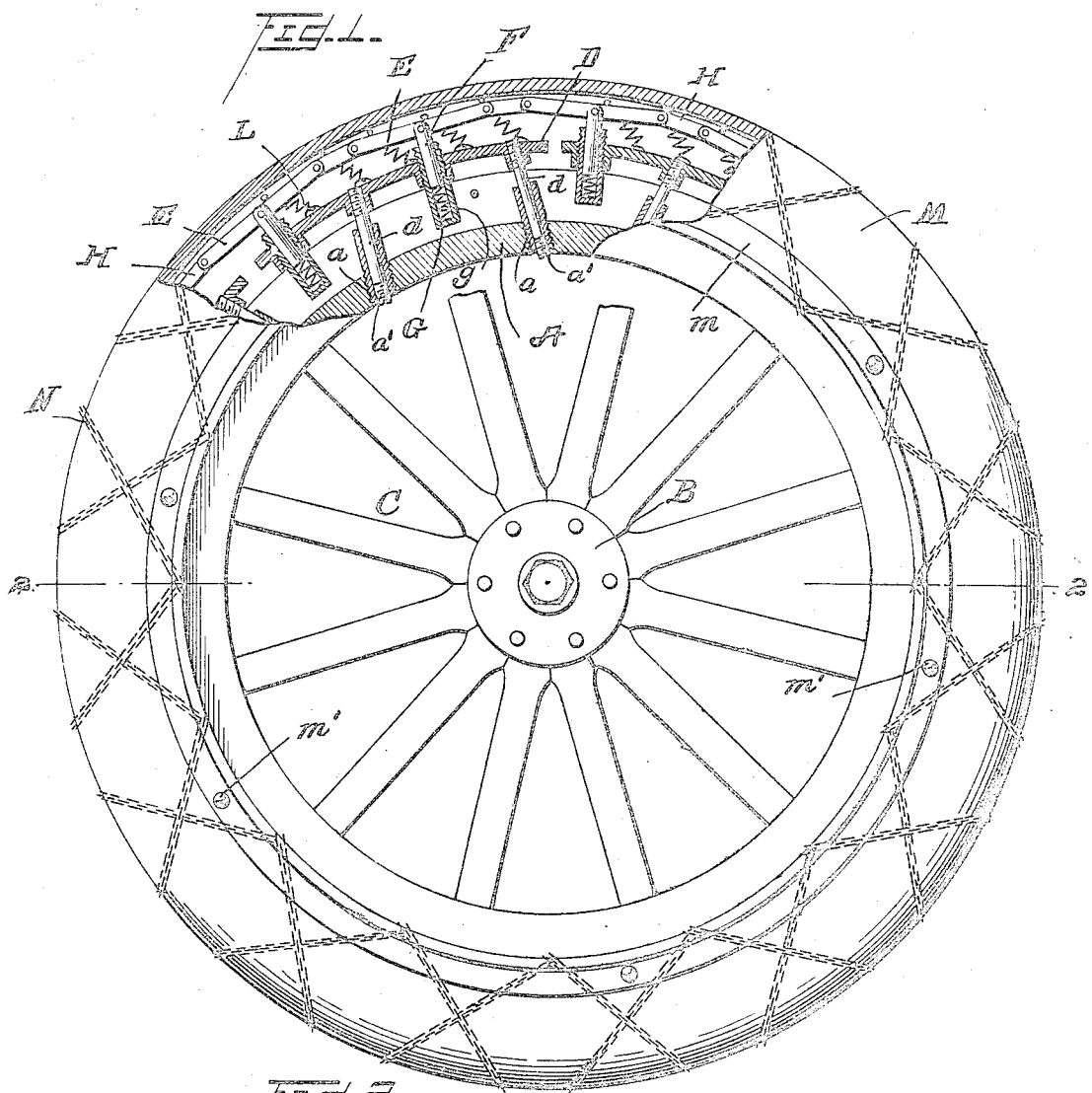
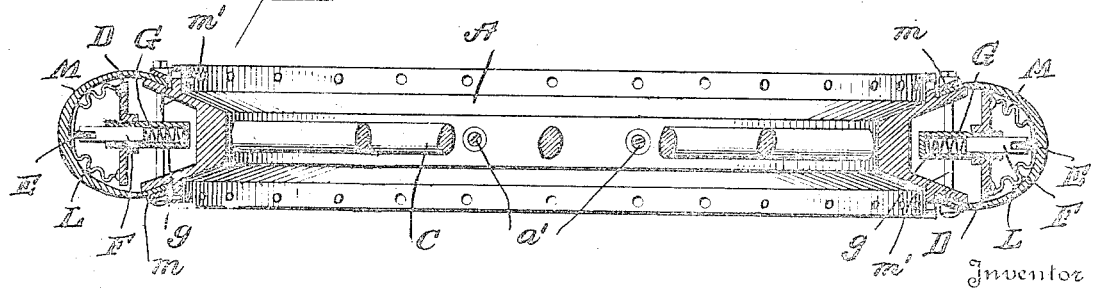

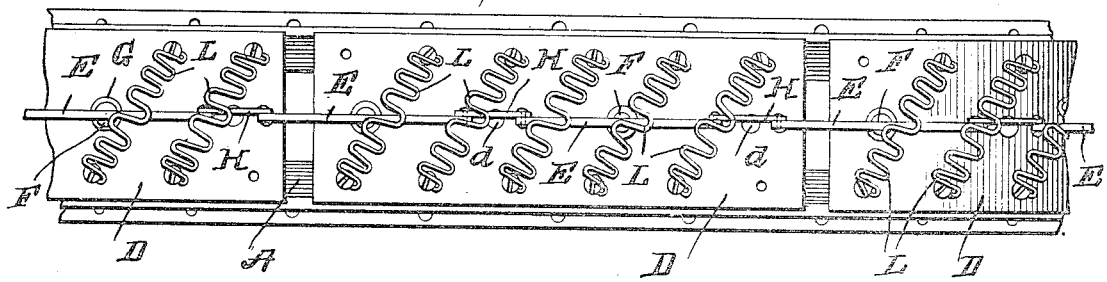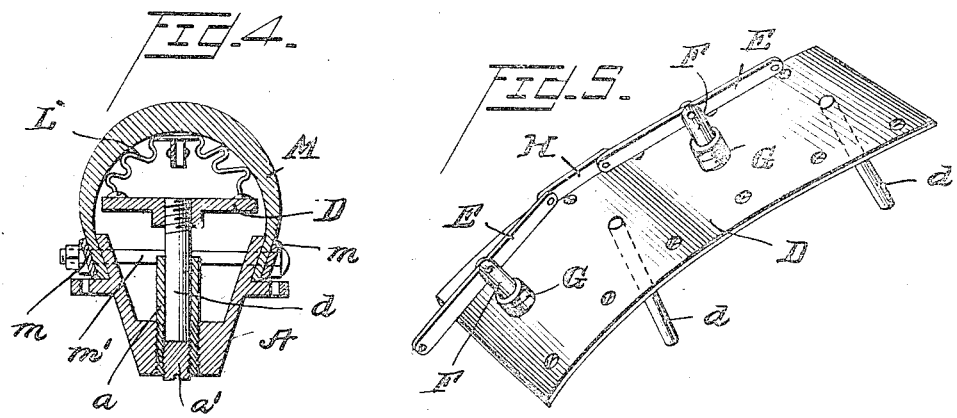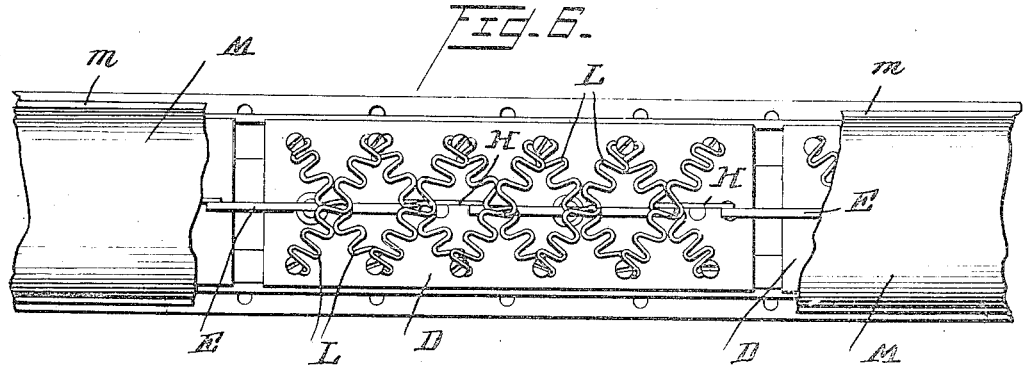

PETER K. OLECHNA, OF SCHENECTADY, NEW YORK.

RESILIENT TIRE FOR VEHICLE-WHEELS.

1,195,849.                         Specification of Letters Patent.      Patented Aug. 22, 1916.

Application filed June 8, 1916.   Serial No. 102,428.

*To all whom it may concern:*

Be it known that I, PETER K. OLECHNA, a subject of the Czar of Russia, residing in Schenectady, in the county of Schenectady and State of New York, have invented certain new and useful Improvements in Resilient Tires for Vehicle-Wheels, of which the following is a specification.

This invention relates to tires for vehicle wheels of the kind provided with metal springs which give them sufficient resiliency for absorbing shocks and thus dispense with the use of pneumatic means for accomplishing the same results.

The objections to the use of pneumatic tires are now so well known that they need not be here stated and spring cushioned tires as heretofore made have not been of such construction as to satisfactorily supplant them.

According to my invention I provide a tire which may be readily applied to the rim of a wheel of suitable construction. It comprises a series of segmental plates supported by the wheel rim and which carry spring supported levers flexibly connected with each other and held in place by springs attached to the segmental plates and extending over the levers. The plates, levers and springs are surrounded by a suitable cover or casing made of any suitable material.

In the accompanying drawing, Figure 1 shows a side elevation with parts broken away of a wheel embodying my improvements. Fig. 2 shows a transverse section on the line 2—2 of Fig. 1. Fig. 3 is a detail view showing in plan some of the segmental plates, levers and springs forming part of the tire. Fig. 4 shows a cross section of the tire and shows how it is connected with the wheel rim. Fig. 5 is a perspective view of one of the segmental plates and shows how the levers are connected therewith. Fig. 6 is a detail view of a modification showing particularly how the levers are held in place on the segmental plates by the springs.

The rim A of the wheel is connected to the hub B by spokes C. These may be of any suitable construction. Surrounding the rim A is a series of segmental plates D, each of which carries rods $d$ which are adjustably secured to it. The rods $d$ extend into sleeves $a$ adjustably secured to the rim A and each of these sleeves carries an adjustable screw plug $a'$. It will be observed that the rods $d$ are not arranged radially, but are arranged tangentially with reference to the hub, the two rods carried by each plate being substantially parallel with each other. In this way the segmental plates are supported in such manner that they may be more accurately adjusted by means of the screw plug $a'$.

Surrounding the plates D is a series of levers E each of which is pivotally connected with a pin F extending into a socket G carried by the plate and inclosing a spring $g$ which bears against the inner end of the rod F. The socket piece G has a threaded connection with the plate D and may be readily adjusted in such manner as to vary the tension of the spring and adjust the position of the levers. Each segmental plate D preferably carries two levers and the outer ends of the several levers are flexibly connected by links H which are pin-jointed to the levers, the joints being somewhat loose. The springs $g$ serve to hold the levers in a circular series around the segmental plates and at a suitable distance therefrom.

In order to hold the levers more securely in normal position and to return them to such position when moved therefrom, I provide springs L which are arranged preferably in the manner shown in Figs. 3, 4 and 6. As shown in Fig. 4 each spring L is attached at opposite ends to the plate D and extends over a lever E and as shown in Fig. 3 the springs are preferably arranged diagonally with reference to the levers as this arrangement has been found to produce the best results. I may also provide two sets of springs L, the springs of each set being diagonally arranged while the springs of the other set, which are also diagonally arranged, cross those of the first mentioned set. By this arrangement the levers are held in their normal position or that shown in Fig. 1, and when any one or more of the levers is removed from normal it is returned thereto when pressure is released.

The plates, levers and springs may be inclosed in any suitable way, as by a cover M attached to the rim A, in the manner shown in Fig. 4, by annular plates $m$ secured in place by bolts $m'$. Anti-skidding chains N may be applied to the cover in the manner indicated in Fig. 1 and the cover, if made of rubber or similar material, may be formed integrally or otherwise provided with suitable anti-slipping or traction producing devices which form no part of my present invention.

I claim as my invention:

1. A vehicle wheel provided with a tire, comprising a series of segmental plates surrounding the rim of the wheel and supported thereby, a series of levers surrounding said plates, yielding supports to which the levers are pivotally connected, and springs attached to the plates and engaging the levers to yieldingly hold them and to return them to their normal positions.

2. A vehicle wheel provided with a tire, comprising a series of segmental plates surrounding the rim of the wheel and adjustably connected therewith, a series of levers surrounding the segmental plates, pins to which said levers are pivotally connected, yielding supports for said pins, flexible connections between the levers, and yielding devices for holding the levers in normal positions, and for returning them thereto.

3. A vehicle wheel provided with a tire, comprising a series of segmental plates surrounding the rim of the wheel and adjustably connected therewith, a series of levers surrounding said plates and flexibly connected with each other, radially arranged pins pivotally connected with the levers, spring sockets which receive said pins and springs attached to the plates extending over the levers and serving to yieldingly hold them in normal positions and for returning them thereto.

In testimony whereof, I have hereunto subscribed my name.

PETER K. OLECHNA.